United States Patent [19]
Beasley et al.

[11] 3,820,018

[45] June 25, 1974

[54] METHOD AND APPARATUS FOR LOCATING ELECTROMAGNETIC RADIATION IN THE VHF AND UHF RANGE FROM DIRECT OR ALTERNATING CURRENT ELECTRIC POWER LINES

[75] Inventors: William L. Beasley; John P. German, both of Bryan, Tex.

[73] Assignee: Research Corporation, New York, N.Y.

[22] Filed: Nov. 4, 1971

[21] Appl. No.: 195,720

[52] U.S. Cl.............. 324/52, 325/67, 325/263, 340/258 D, 324/133
[51] Int. Cl............................................. G01r 31/08
[58] Field of Search............ 324/52, 72, 133; 343/113 R, 113 PT; 325/67, 363, 364; 340/258 D

[56] References Cited
UNITED STATES PATENTS

| | | | |
|---|---|---|---|
| 2,698,921 | 1/1955 | Wharton | 324/52 |
| 2,974,278 | 3/1961 | Kennon | 324/52 |
| 3,309,690 | 3/1967 | Moffitt | 324/67 |

FOREIGN PATENTS OR APPLICATIONS

| | | | |
|---|---|---|---|
| 575,514 | 5/1959 | Canada | 324/72 |
| 1,123,343 | 8/1968 | Great Britain | 324/72 |

OTHER PUBLICATIONS

Sprague Operating Manual–Model 500 Interference Locator; Sprague Electrical Co., North Adams, Mass. (Copyright 1959).

*Primary Examiner*—Robert J. Corcoran
*Attorney, Agent, or Firm*—Cooper, Dunham, Clark, Griffin & Moran

[57] ABSTRACT

Method and apparatus for locating electromagnetic radiation from sparks on electric power lines carrying direct or alternating current. A receiver is provided that includes a variable threshold by which signals are detected only when they exceed the threshold. During a search for a noise source, as the receiver is moved toward the source the threshold is raised to avoid detecting spurious noise signals from directions other than from the noise source being located.

4 Claims, 6 Drawing Figures

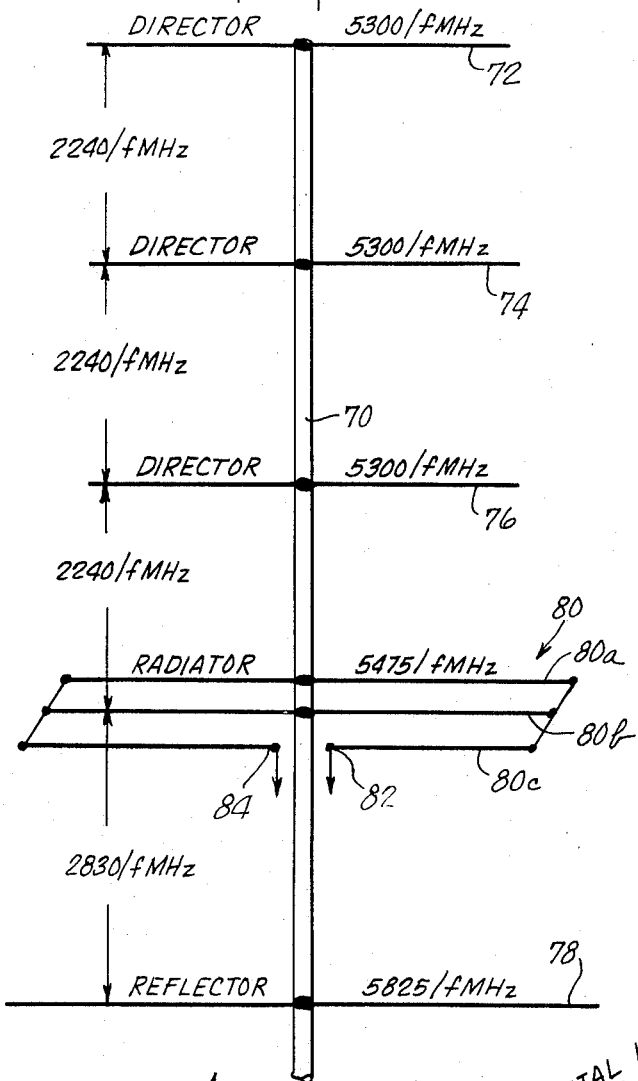
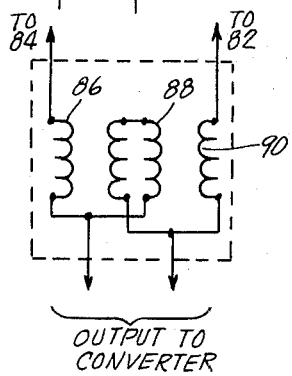
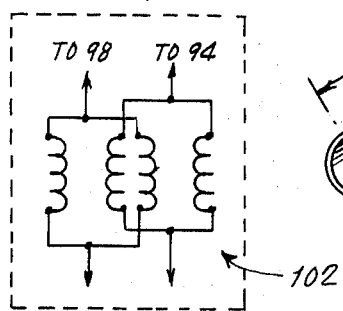
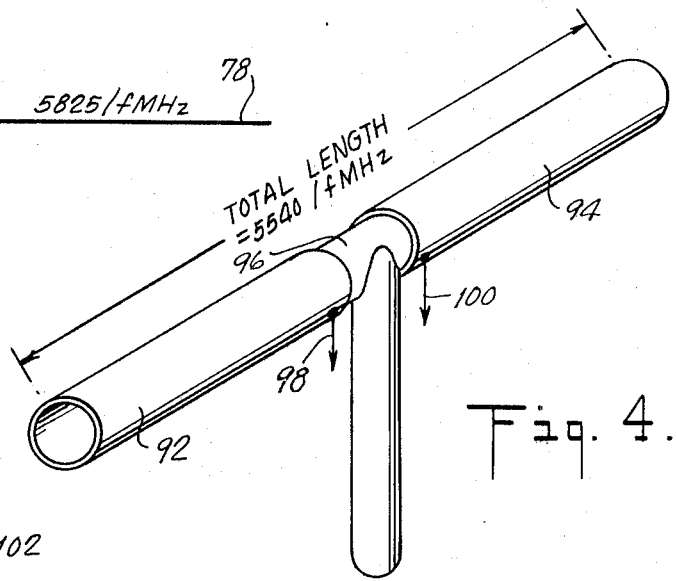

METHOD AND APPARATUS FOR LOCATING ELECTROMAGNETIC RADIATION IN THE VHF AND UHF RANGE FROM DIRECT OR ALTERNATING CURRENT ELECTRIC POWER LINES

BACKGROUND AND BRIEF DESCRIPTION OF THE INVENTION

This invention relates to the locating of electromagnetic radiation in the VHF and UHF range from a spark on electric power line carrying direct or alternating current.

Electric power lines are the sources of noise by virtue of electromagnetic radiation from the line that is caused by sparks between conductive hardware items. Electric utility companies have long been involved in the detection of such noise sources, to minimize interference with radio and television receivers.

The present invention is directed toward providing an improved testing instrument for locating electromagnetic radiation from a noise source, as well as an improved method of operating such a testing instrument.

A presently-preferred embodiment of the invention includes a detector that has a variable threshold associated therewith, variable upwardly from a zero level, so that the threshold may be varied during a search for a noise source. It has been found that if the threshold of the receiver is raised during a search while the receiver is being moved toward the noise source, spurious noise signals may be eliminated so that only noise signals emanating directly from the source (and not reflected from other objects, for example) are detected. The noise source may thereby be easily located.

Representative prior art patents are as follows:

| U.S. Pat. No. | Issued | Patentee |
| --- | --- | --- |
| 2,698,921 | 4 Jan. 1955 | Wharton |
| 3,295,022 | 27 Dec. 1966 | Schelisch |

Schelisch discloses apparatus for the detection of discharges in high-power transmission channels. There the testing instrument is directly coupled by a conductor to the transmission channel. There is no movement of a receiver toward a noise source as in the present invention, and there is no raising of a threshold during a search for a noise source as in the present invention. Schelisch does provide a noise detector and indicator which are adjusted so that only noise exceeding a predetermined threshold value is indicated; the variation of threshold is in no way suggested as in the present invention.

Wharton discloses a testing instrument for the detection of faults in electric lines. The circuit involved utilizes the detection of electromagnetic and electrostatic fields. The movement of a receiver toward a noise source along with raising of a detection threshold is not suggested in this patent.

The invention may be more completely understood by reference to the following detailed description of a presently-preferred embodiment.

BRIEF DESCRIPTION OF THE DRAWING

FIG. 3 shows a representative directional-type antenna useful in the practice of the invention;

FIG. 3a is a diagram of a coupling transformer useful with the antenna of FIG. 3;

FIG. 4 shows another antenna;

FIG. 4a shows another coupling transformer useful with the antenna of FIG. 4.

DETAILED DESCRIPTION

Figure 1:
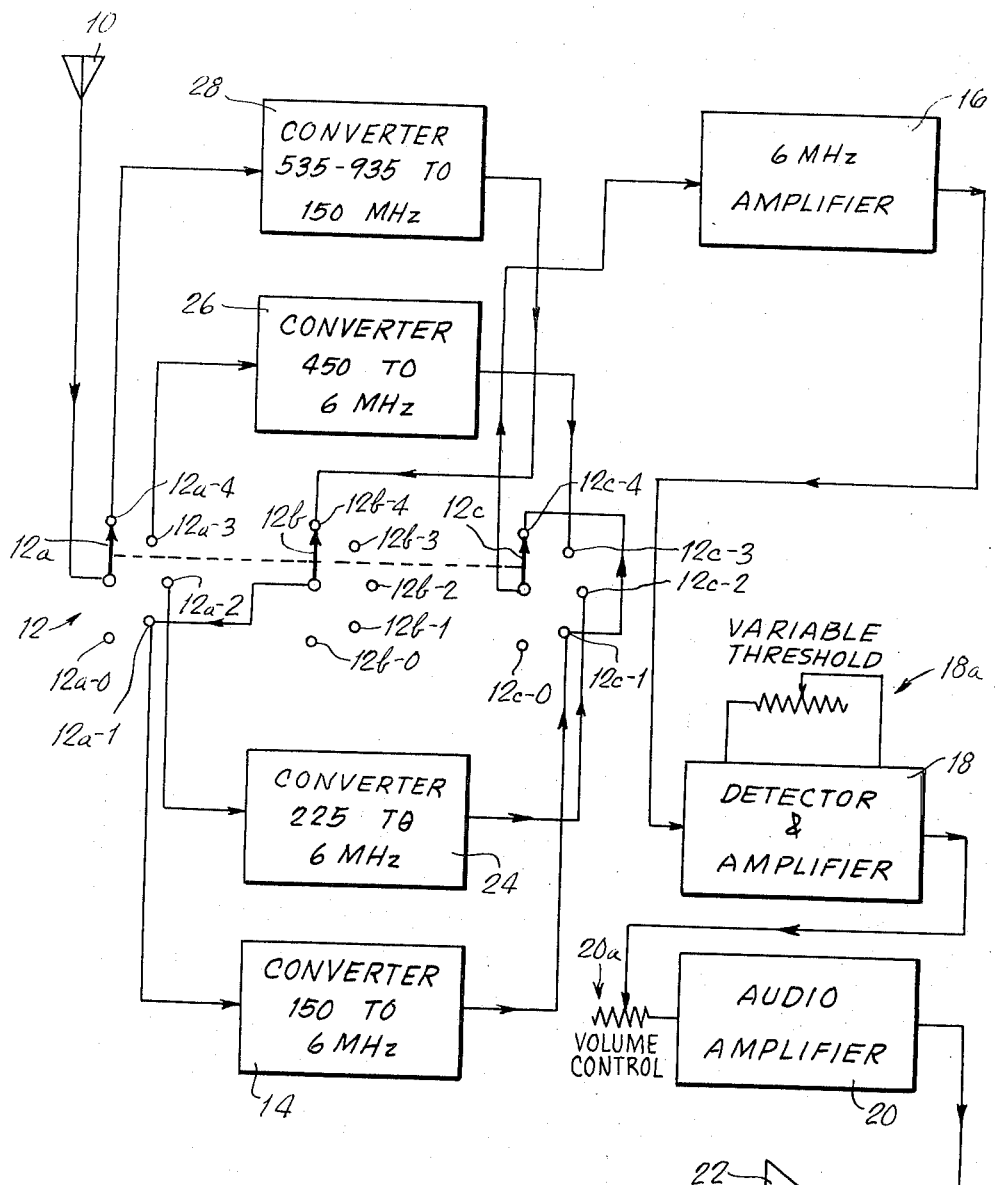
FIG. 1 is a block diagram of a circuit embodying the invention.

Referring to FIG. 1, there is shown in block diagram form a circuit comprising a testing instrument for locating electromagnetic radiation from electric power lines. A directional antenna, schematically indicated at 10, receives electromagnetic radiation in the VHF/UHF range (the VHF band is generally considered to be the range of frequencies 30 to 300 megahertz; the UHF band is the range 300 to 3,000 megahertz). Radiation of this frequency emanates from a part of the power line in which there is a loose conductor, for example, or some other condition so as to comprise a "noise" source in the line. This type of radiation is picked up by radios and television sets in the vicinity of the power line, which is undesirable.

Signals from the directional antenna 10 are applied to a multi-position switch 12 which includes three movable contacts 12a, 12b and 12c, which are ganged together. There is an OFF position of the switch in which the three movable contacts make contact with fixed contacts 12a–0, 12b–0 and 12c–0.

In the first position of the switch 12, the three movable contacts engage the fixed contact segments 12a–1, 12b–1 and 12c–1. Thus signals are applied from the antenna 10 to a converter 14, which has been indicated as converting the input signal from 150 megahertz to 6 megahertz. These frequencies are simply representative.

The converter 14 is conventional, and includes two RF amplifier stages and mixer and oscillator stages. The RF stages are tuned to the incoming frequency, in this case 150 megahertz, and the local oscillator and mixer stages convert the incoming signal to the output frequency, in this example 6 megahertz. A suitable type converter 14 has been found to be a fixed-frequency converter manufactured by Vanguard Electronic Laboratories, of 196–23 Jamaica Avenue, Hollis, New York 11423 under their Vanguard Model 407. A corresponding converter is described in "A VHF Polarimeter" by William E. Faulkerson, June 1970, Technical Report No. 35, prepared under National Aeronautics and Space Administration Grant NGL05–020–014 and published under No. SU–SEL–70–035 by Radioscience Laboratory, Stamford Electronics Laboratories, Stamford University, Stamford, California.

Signals from the converter 14 are applied through the fixed switch contact 12c–1 and the movable switch contact 12c to an amplifier 16. The amplifier 16 is indicated as being tuned to 6 megahertz, which is representative. The frequency of the amplifier 16 is the same as the frequency of the output signal from the converter 14.

Figure 2:
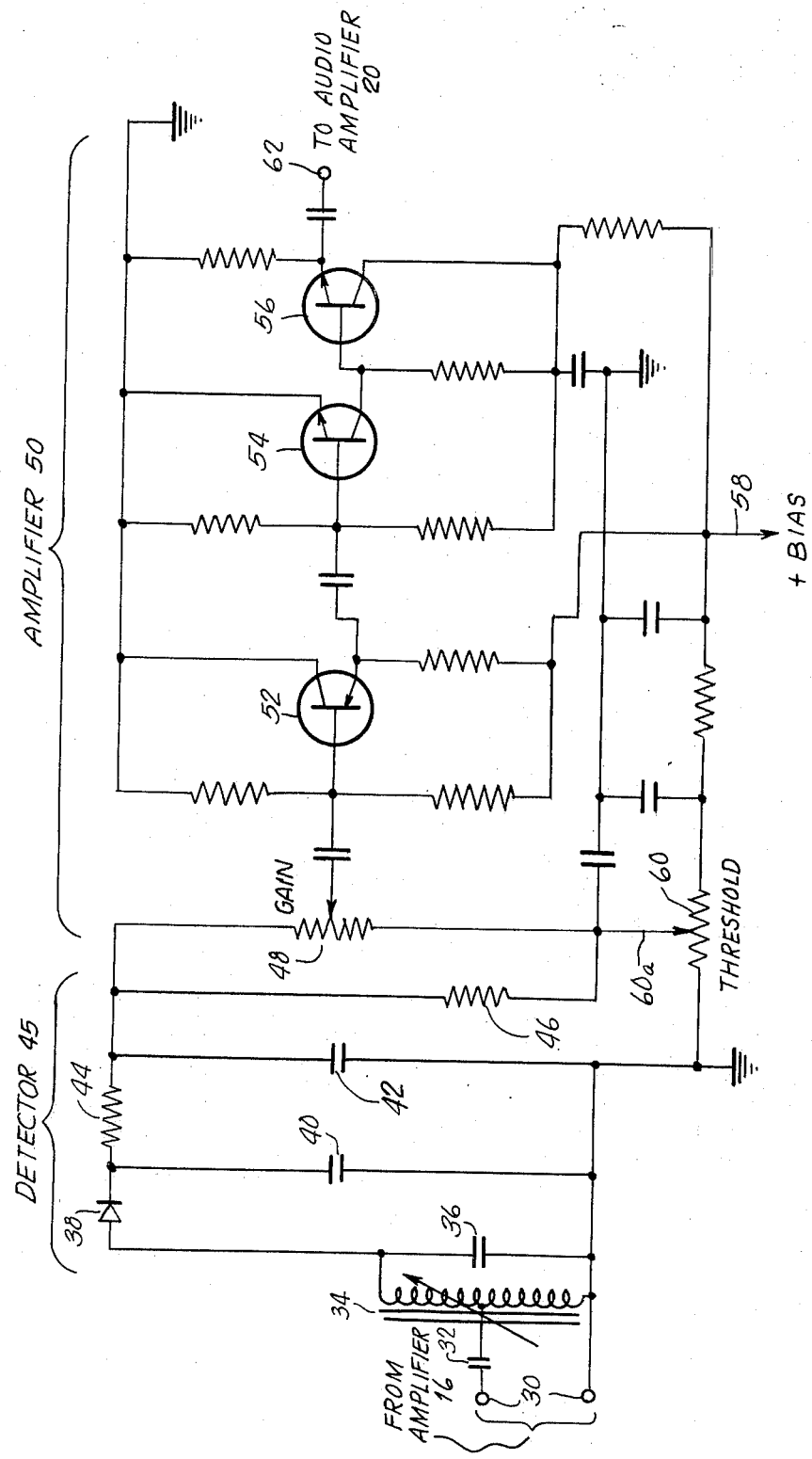
FIG. 2 is a diagram of a circuit comprising a detector and amplifier which is incorporated in the circuit of FIG. 1.

Signals from the amplifier 16 are applied to a detector and amplifier 18, which has a variable threshold designated generally as 18a. The detector portion of unit 18 detects only those input signals from the amplifier 16 that exceed the threshold as set for the detector by the variable threshold 18a. A representative circuit for the detector and amplifier 18 is shown in FIG. 2, to be described below.

Signals from the detector and amplifier 18 are applied to an audio amplifier 20, which is conventional and which includes a volume control designated generally as 20a. Signals from the audio amplifier 20 are applied to a loudspeaker 22 to provide an audible signal.

There are three other converters shown in FIG. 1, namely, converters 24, 26 and 28. The converter 24 is indicated as converting signals from 225 megahertz to 6 megahertz; the converter 26 is indicated as converting signals from 450 megahertz to 6 megahertz; the converter 28 is indicated as being variable and converting signals anywhere in the range chosen, to 935 megahertz to 150 megahertz. All these frequencies are representative. In the examples chose, however, the converter 24 receives signals from the directional antenna 10 when the switch contact 12a is in engagement with the fixed contact 12a–2. In this case input signals of a frequency 225 megahertz are amplified and converted to 6 megahertz to be transmitted to the amplifier 16 via the fixed switch contact 12c–2 and the movable switch contact 12c. The converter 26 receives signals from the antenna 10 when the movable switch contact 12a is in engagement with the fixed switch contact 12a–3. In this case signals are supplied from the converter 26 via the fixed switch contact 12c–3 and movable switch contact 12c to the amplifier 16.

The converter 28 receives signals from the antenna 10 when the movable switch contact 12a is in engagement with the fixed switch contact 12a–4. The converter is tuned to a frequency within its variable range; for example, the radio frequency amplifier stage of the converter may be tuned to receive signals of a frequency of 845 megahertz. In this case the conversion, for the sake of convenience, is not directly to 6 megahertz but rather to an intermediate frequency of 150 megahertz, for example. Thus, signals from the converter 28 are applied via the fixed switch contact 12b–4, the movable switch contact 12b, and the fixed switch contact 12a–1 (which is connected to the movable switch contact 12b) to the converter 14 (which is tuned to a frequency the same as the frequency of the output signal from the converter 28). Thus, the signals from the converter 28 undergo a further conversion in the converter 14 to the final frequency of 6 megahertz chosen in this example. The output from the converter 14 in this case passes from fixed switch contact 12c–1 to fixed switch contact 12c–4 and thence via the movable switch contact 12c to the amplifier 16.

The three converters 14, 24 and 26 may all be identical, except that they are tuned to different input frequencies. All may be Vanguard Model 407 converters referred to above. The converter 28 may be a conventional UHF converter, such as converter Model 6709 sold by Channel Master Corporation of Ellenville, New York. The "front end" of such a converter (manufactured by Gavin Instruments, Inc., 1450 Route 22, Somerville, New Jersey) involving the radio frequency amplifier, oscillator and mixer circuits is employed. Since the output frequency of a standard UHF converter is television Channel 5 (76 to 82 megahertz) or Channel 6 (82 to 88 megahertz), it is necessary to modify the oscillator frequency so that an output frequency the same as that of the converter 14 is obtained, namely, 150 megahertz in this example. In the Channel Master UHF converter Model 6709 referred to above, changing the oscillator frequency was possible by removing the oscillator wiper (the movable part of the tuned circuit) reversing it by 180 mechanical degrees, and reinserting the wiper in its holder. This caused a shifting of the oscillator frequency in the converter, so that an output signal of 150 megahertz was obtained for an input signal between 535 and 935 megahertz. In place of this modification, another converter, (e.g., 75 to 6 megahertz) could be employed in conjunction with the Model 6709 converter to provide a suitable output frequency.

The amplifier 16 is conventional. A suitable amplifier is manufactured by Vanguard Electronic Laboratories, designated as its MOSFET preamplifier which is tuned to 6 megahertz, for example. A corresponding amplifier is shown in the report by William E. Faulkerson referred to above.

The audio amplifier 20 is also conventional. A suitable circuit is manufactured by Motorola, Inc. under their designation HEP 593. See 1971 Edition "Semiconductor Cross-Reference Guide & Catalog," Motorola HEP Semiconductors.

A representative and presently preferred circuit constituting the detector and amplifier 18 is shown in FIG. 2. Referring to FIG. 2, the signal from amplifier 16 is applied to input terminals 30. A capacitor 32 serves as a blocking capacitor and couples AC signals to a circuit consisting of variable inductor 34 and capacitor 36. The circuit of inductor 34 and capacitor 36 is tuned to the frequency of the amplifier 16, namely, 6 megahertz in the example chosen. The 6 megahertz output signals are coupled through detector diode 38 to a network consisting of capacitors 40 and 42 and resistor 44. These capacitors and resistor serve to smooth the input signal and to develop an average value signal. These capacitors, resistor and detector diode constitute a typical detector circuit, designated detector 45 in FIG. 2.

The detector 45 includes a variable threshold constituted by a potentiometer 60 whose variable pickoff 60a is coupled to the cathode of diode 38 through resistors 46 and 44 to bias the diode. Variation of the potentiometer 60 varies the diode bias and hence the threshold of the detector 45; signals below the threshold are not passed by the diode 38 (are not detected by the detector 45). From FIG. 2 it is apparent that the threshold is variable upwardly from a zero level of threshold. That is, if pickup 60a is moved all the way to the left in FIG. 2, i.e., to the position in which it is grounded, there is no bias from bias conductor 58 applied to the cathode of the diode 38, and hence the diode passes all signals applied thereto (zero threshold level). As the pickup 60a is moved to the right in FIG. 2, increasing amounts of bias from bias conductor 58 are applied to the cathode of diode 38, raising the threshold level.

Signals from the detector 45 are applied to resistor 48, which is variable and serves as a gain control of an amplifier 50. The amplifier 50 is conventional and composed of transistors 52, 54 and 56. A bias voltage is supplied to the circuit via a conductor 58. The resistors and capacitors that form a part of the amplifier 50 will not be explained in detail, inasmuch as the amplifier is conventional, and these components simply serve in conventional fashion for biasing and signal coupling. Thus, an output signal is developed at output terminal 62 only for those input signals applied to the detector 45 that exceed the predetermined threshold (which is variable) determined by the threshold control 60. The gain control 48 is conventional and simply determines the overall gain of the amplifier 50.

Normally a different directional antenna is used for each of the different frequencies involved in the circuit of FIG. 1. FIG. 3 shows a conventional five-element Yagi antenna which may be used in connection with the converters 24, 26 and 28. Each of these converters constitutes a different channel, and there is a different antenna for each channel. The antenna shown in FIG. 3 includes a conventional boom 70 to which are joined three director elements 72, 74 and 76, a reflector element 78, and a group of three radiator elements 80. The radiator elements 80 comprise two rods 80a and 80b which are connected to the boom 70. The third rod 80c is not connected to the boom; its two ends 82 and 84 serve as output connections from the antenna. The lengths of the director, radiator and reflector elements are given in the following table:

Reflector length (in inches) = $5825/f_{MHz}$
Radiator length (in inches) = $5475/f_{MHz}$
Director length (in inches) = $5300/f_{MHz}$
Spacing between reflector and radiator (in inches) = $2830/f_{MHz}$
Spacing between radiator and first director (in inches) = $2240/f_{MHz}$
Spacing between any two directors (in inches) = $2240/f_{MHz}$ Since the converter 28 is typically variable in covering a frequency range of from 535 to 935 megahertz, the antenna associated therewith will have to be for a given frequency within that range. A typical frequency that has been found to be useful in practice is 845 megahertz. Of course, it will be realized that the converter 28 may be a fixed frequency converter and not variable, in which case a frequency greater than the frequency to which the converter 26 is tuned will be employed, along with a corresponding antenna. Alternatively, with a variable converter 28, any number of different antennas may be employed to provide for the reception of different frequency signals within the range of frequencies covered by the converter.

FIG. 3a shows a transformer arrangement consisting of coils 86, 88 and 90, which is useful with the antenna of FIG. 3, serving to couple the antenna signal to the associated converter. A balun-type transformer has been found to be suitable, one particular model being Model 7281 made by Channel Master Corporation.

While an antenna such as shown in FIG. 3 may be used in conjunction with the converter 14 for 150 megahertz, such a five-element antenna may be a little large and awkward to use. Accordingly, a simple dipole antenna such as shown in FIG. 4 may be employed utilizing two cylindrical conductors 92 and 94 positioned over a dielectric dowel 96. The total length of the dowel (in inches) is expressed by the following formula:

Total length (in inches) = $5540/f_{MHz}$

Output conductors 98 and 100 at the inside ends of the cylindrical conductors 92 and 94 conduct output signals to a coupling transformer 102 shown in FIG. 4a. The coupling transformer 102 is similar to the transformer shown in FIG. 3a, the difference being in the connections which are apparent from a comparison of the two figures.

The equipment described above is used as follows in a search for a noise source. Generally, a search will be conducted utilizing the 225 megahertz converter 24. Thus, the switch 12 is positioned to provide signals to that converter. An appropriate antenna is selected for use at the frequency of 225 megahertz. It has been found that most noise sources that are strong enough to cause interference in a television set or a radio set can be heard within a distance of two or three blocks away from the source at a frequency of 225 megahertz. However, if noise cannot be detected at this frequency, then it is recommended that the 150 megahertz converter 14 be employed, with an appropriate antenna utilized and the switch 12 positioned so as to conduct signals from the antenna to that converter.

A search for a noise source is usually begun with a maximum gain setting of the audio amplifier 20 and a minimum threshold setting of the detector and amplifier 18. The antenna being employed should be moved until a maximum signal is heard from the loudspeaker, at which time the antenna will be pointing in the general direction of the noise source. At this time the gain may be reduced and the threshold may be increased until the noise signal can just be heard. The user then walks toward the noise source, at which time the signal level will increase. As the user walks toward the noise source, the threshold level should be increased. This increasing of threshold with respect to the detector and amplifier 18 is important, inasmuch as the user can begin to hear noise from many directions other than from the noise source. The signals from many directions are caused by reflection of waves from the ground and nearby objects. With the threshold increased, the signals emanating directly from the noise source are strong enough to be detected by the detector and amplifier 18, but the spurious reflections are less than the threshold and hence are not detected and amplified.

The user can normally walk to a utility pole containing a noise source, for example, employing the 225 megahertz converter 24 and the associated 225 megahertz Yagi antenna. However, occasionally when there are multiple noise sources on adjacent poles, the user will find it helpful to change the channel to 450 megahertz (the converter 26) and a corresponding 450 megahertz Yagi antenna. In this respect, 450 megahertz signals are attenuated a greater amount than 225 megahertz signals. Accordingly, use of the 450 megahertz channel allows greater accuracy in determining the correct utility pole or noise source.

It should be noted that when channels are changed, it is generally necessary to readjust the threshold control in the detector and amplifier 18 because of the change in signal level in the circuitry.

Once the correct utility pole containing a noise source has been located, it is generally preferable to change channels to utilize the converter 28, i.e., to employ a frequency in the range 535 to 935 megahertz. As noted above, it has been found that 845 megahertz, in particular, is a suitable frequency for this channel, and searches have been conducted employing this frequency. Not all noise sources radiate signals an appreciable distance at a frequency of 845 megahertz, and it may be that the user of a testing instrument will not hear a signal from the ground at this frequency. However, many noise sources do radiate appreciable signals at this frequency which can be heard. If the user of the testing instrument can get within a few feet of the noise source, for example, by utilizing a bucket truck, then the higher frequency channel represented by the converter 28 may be most useful in locating the exact noise source.

The association of a directional-type antenna with a threshold-adjustable detector and suitable amplifiers constitute a unique combination of apparatus to produce an improved radio noise-source locating instrument.

In connection with the circuits described above, which are representative but which are also presently preferred, circuit details have been omitted which are wholly within the province of a technician skilled within the art. For example, it should be apparent that the various sections of the testing instrument should be appropriately coupled together, and that impedences should be appropriately matched. Further modifications will suggest themselves to those skilled in the art. For example, specific frequencies have been disclosed as suitable; these are representative, as has been indicated. While a specific frequency of 935 megahertz constitutes the upper limit of the frequencies employed in the representative embodiment of FIG. 1, it is possible to utilize still higher frequencies. For example, a noise detector operating within the range 1,200 to 1,500 megahertz could be mounted on the end of a conventional "hot stick" to aid the user in locating which part of a pole contains a noise source. As another example, the antennas employed could be hand held or mounted on a truck. If mounted, several degrees of freedom of movement should be provided. Still further, automatic variation of threshold may be employed with suitable circuitry.

These modifications and other will suggest themselves to those skilled in the art. Accordingly, the invention should be taken to be defined by the following claims:

We claim:

1. In a method of locating the source of electromagnetic radiation in the VHF and UHF range radiated by an electric power line, in which a receiver is used to detect said electromagnetic radiation that exceeds a threshold, and the receiver is moved toward the source of radiation, the improvement comprising initially setting the threshold at a minimum value when a search for a source of electromagnetic radiation is commenced and then raising the threshold of said receiver during the time that the receiver is moved toward said source, with said threshold being raised such that said electromagnetic radiation from said source is just detected in said receiver during the time that said receiver is moved toward said source.

2. A method according to claim 1, in which the receiver includes a movable directional antenna, and comprising the initial steps of fixing the location of the receiver, moving the antenna until a maximum signal representing electromagnetic radiation in the VHF and UHF range is detected, raising the threshold until the signal is just detected, and then moving the receiver towards said source in the direction in which said antenna is pointing while raising the threshold of the receiver still further so that said signal is just detected.

3. A method of locating the source of electromagnetic radiation in the VHF and UHF range radiated by an electric power line, in which a receiver is used to detect said electromagnetic radiation that exceeds a threshold, in which the receiver includes separate channels tuned to receive different frequencies of electromagnetic radiation, one of said channels being operative at any time, and a plurality of movable directional antennas each for a different one of said channels and each tuned to receive signals of a frequency of the corresponding channel, one of said directional antennas being coupled to said receiver at any time to supply signals to the receiver, comprising the steps of initially selecting an antenna and channel of a lower one of the available frequencies in commencing a search, fixing the location of the receiver, moving the selected antenna until a maximum signal representing electromagnetic radiation in the VHF and UHF range is detected, raising the threshold until the signal is just detected, and then moving the receiver towards said source in the direction in which said antenna is pointing while raising the threshold of the receiver still further so that said signal is just detected, and changing to an antenna and corresponding channel of higher frequency when the receiver has been moved closer to the source following commencement of the search.

4. A testing instrument for locating electromagnetic radiation in the VHF and UHF range from direct or alternating current electric power lines, comprising directional receiving means for sensing electromagnetic radiation in said range radiated by a power line and generating signals thereby; a diode connected to pass signals from said receiving means and provided with a bias potential variable upwardly from electrical ground level to vary upwardly from zero the threshold level of said diode which must be exceeded by said signals from said receiving means in order to pass through said diode; and indicating means coupled to said diode and comprising an audio amplifier with adjustable gain and a loudspeaker for providing an audible indication of signals passing through said diode and exceeding said threshold level.

* * * * *